United States Patent
Duluk, Jr. et al.

(10) Patent No.: US 9,495,721 B2
(45) Date of Patent: *Nov. 15, 2016

(54) EFFICIENT SUPER-SAMPLING WITH PER-PIXEL SHADER THREADS

(71) Applicant: NVIDIA CORPORATION, Santa Clara, CA (US)

(72) Inventors: Jerome F. Duluk, Jr., Palo Alto, CA (US); Rouslan Dimitrov, Santa Clara, CA (US); Eric Lum, San Jose, CA (US); Rui Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/725,782

(22) Filed: Dec. 21, 2012

(65) Prior Publication Data
US 2014/0176579 A1    Jun. 26, 2014

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01); *G06T 2210/52* (2013.01)

(58) Field of Classification Search
CPC .. G09G 2340/10; G09G 5/02; G09G 11/001; G06T 15/50; G06T 15/80; G06T 15/503; G06T 2210/52; G06T 1/20; G06F 9/4881; G06F 9/52; G06F 9/462; G06F 9/4843; G06F 9/3851
See application file for complete search history.

(56) References Cited

U.S. PATENT DOCUMENTS

| | | | |
|---|---|---|---|
| 6,459,428 B1 * | 10/2002 | Burk et al. | 345/419 |
| 8,643,659 B1 * | 2/2014 | Baldwin | 345/557 |
| 9,082,212 B2 * | 7/2015 | Duluk, Jr. | G06T 15/005 |
| 2010/0001999 A1 | 1/2010 | Everitt et al. | |
| 2010/0031268 A1 | 2/2010 | Dwyer et al. | |
| 2011/0090250 A1 * | 4/2011 | Molnar et al. | 345/632 |
| 2014/0176547 A1 * | 6/2014 | Duluk et al. | 345/426 |

FOREIGN PATENT DOCUMENTS

| | | |
|---|---|---|
| TW | 201137786 A | 11/2011 |
| TW | 201214326 A | 4/2012 |

* cited by examiner

*Primary Examiner* — Antonio A Caschera
(74) *Attorney, Agent, or Firm* — Artegis Law Group, LLP

(57) ABSTRACT

Techniques for dispatching pixel information in a graphics processing pipeline. A fragment processing unit generates a pixel that includes multiple samples based on a first portion of a graphics primitive received by a first thread. The fragment processing unit calculates a first value for the first pixel, where the first value is calculated only once for the pixel. The fragment processing unit calculates a first set of values for the samples, where each value in the first set of values corresponds to a different sample and is calculated only once for the corresponding sample. The fragment processing unit combines the first value with each value in the first set of values to create a second set of values. The fragment processing unit creates one or more dispatch messages to store the second set of values in a set of output registers.

20 Claims, 13 Drawing Sheets

EFFICIENT SUPER-SAMPLING WITH PER-PIXEL SHADER THREADS

BACKGROUND OF THE INVENTION

Field of the Invention

The present invention generally relates to three-dimensional (3D) graphics processing, and, more particularly, to efficient super-sampling with per-pixel shader threads.

Description of the Related Art

Computer generated images that include 3D graphics objects are typically rendered using a graphics processing unit (GPU) with one or more multistage graphics processing pipelines. Such graphics pipelines include various programmable and fixed function stages. Programmable stages include various processing units that execute shader programs to render graphics objects and to generate various visual effects associated with graphics objects. One example of a programmable stage is a fragment processing unit that includes a pixel shader program. Pixel shader programs receive the geometry fragments, such as line segments and triangles, and compute color information, depth information, and other attributes of each individual pixel. The resulting pixel information is stored in output registers. The output registers are subsequently read by a fixed function stage known as the raster operations unit or ROP. The ROP receives pixel color, depth, and other information from the pixel shader program, blends this pixel information with corresponding pixel information stored in one or more render targets, and stores the blended pixel information back into the one or more render targets. Typically, the blending operations in the ROP are limited to a set of fixed function operations.

Certain blending effects are not achievable within the ROP, due to the fixed function nature of the ROP. To create such blending effects, the pixel shader program may include one or more programmable blending features, where the pixel shader program reads pixel information directly from the render targets (destination pixel information), blends the pixel information with the pixel information calculated by the pixel shader program (source pixel information), and stores the blended pixel information into the output registers. The pixel shader program flexibly performs a programmable blend on the pixel information. Accordingly, blending is not restricted to the fixed function blending operations included in the ROP. One drawback with this approach is that processing order of pixel shaders is generally not guaranteed in a GPU with multiple instances of pixel shader programs running at the same time, or with graphics processing pipelines. Certain sequential sets of blending operations perform properly if graphics objects are blended in a specific order. In one example, two graphics objects could intersect with a given pixel. The first graphics object could be blended into a render target by a first graphics processing pipeline. The second graphics object could be blended into a render target by a second graphics processing pipeline. However, the result of the blending operation could be different depending on whether the first graphics object is blended into the render target before the second graphics object or after the second graphics object. As a result, the GPU would not consistently blend graphics objects correctly.

In some applications, image quality is improved by rendering multiple samples for each pixel, where each sample can represent a subset of the area covered by a corresponding pixel. Such a mode is called super-sampling mode. In a render target configured for super-sampling, each pixel is stored as multiple samples, where each sample can include color information, depth information, and other attributes. With super-sampling, a single instance of the pixel shader program calculates and stores the color, depth and related information for only one sample. Once rendering completes, the samples for a given pixel are combined, resulting in the final pixel color for display on the display device. One drawback with this approach is that each instance of the pixel shader program consumes a separate processing element in the GPU. For pixels that include four samples, super-sampling consumes four times the pixel shader resources as compared to consuming only one pixel shader per pixel.

As the foregoing illustrates, what is needed in the art is an improved technique for performing pixel shading operations in a graphics processing pipeline.

SUMMARY OF THE INVENTION

One embodiment of the present invention sets forth a method for dispatching pixel information in a graphics processing pipeline. The method includes generating a pixel that includes a plurality of samples based on a first portion of a graphics primitive received by a first thread. The method further includes calculating a first value for the first pixel, where the first value is calculated only once for the pixel. The method further includes calculating a first set of values for the samples in the plurality of samples, where each value in the first set of values corresponds to a different sample in the plurality of samples and is calculated only once for the corresponding sample. The method further includes combining the first value with each value in the first set of values to create a second set of values. The method further includes creating one or more dispatch messages to store the second set of values in a set of output registers.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

One advantage of the disclosed techniques is that pixel shader programs perform per-sample operations with increased efficiency. In typical scenarios, the pixel shader program achieves the higher image quality of per-sample pixel shading, with performance approaching that of per-pixel shading.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
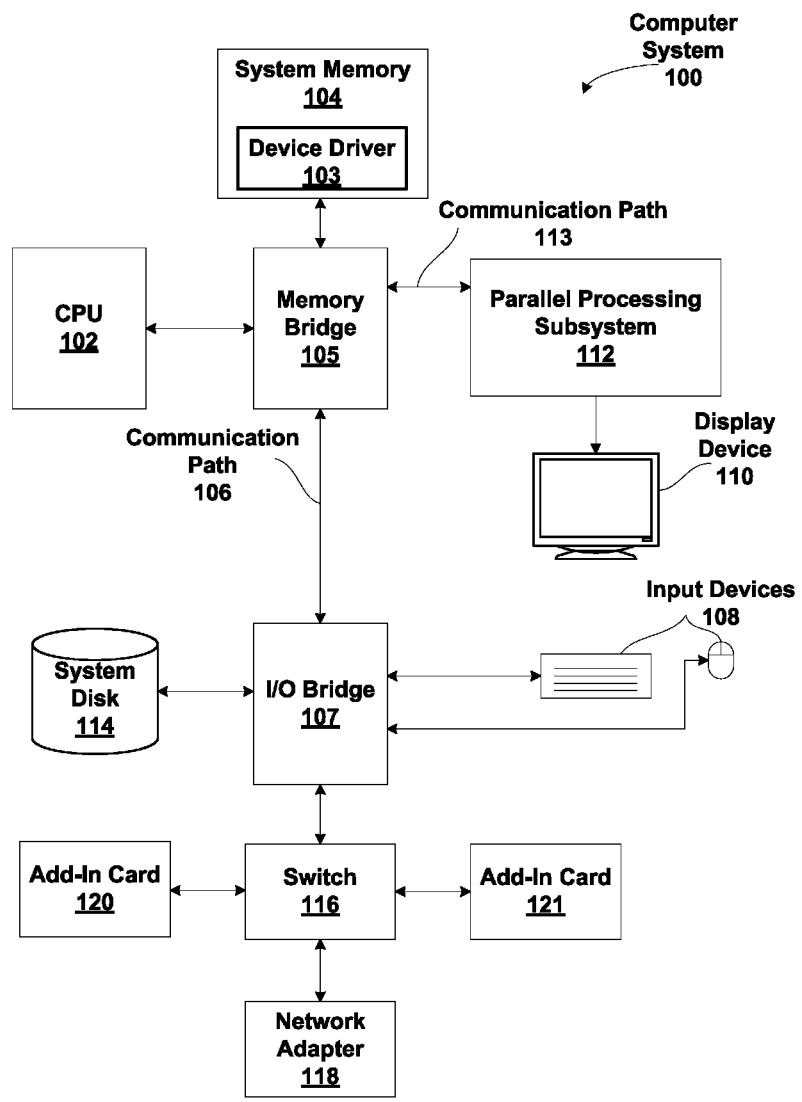
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
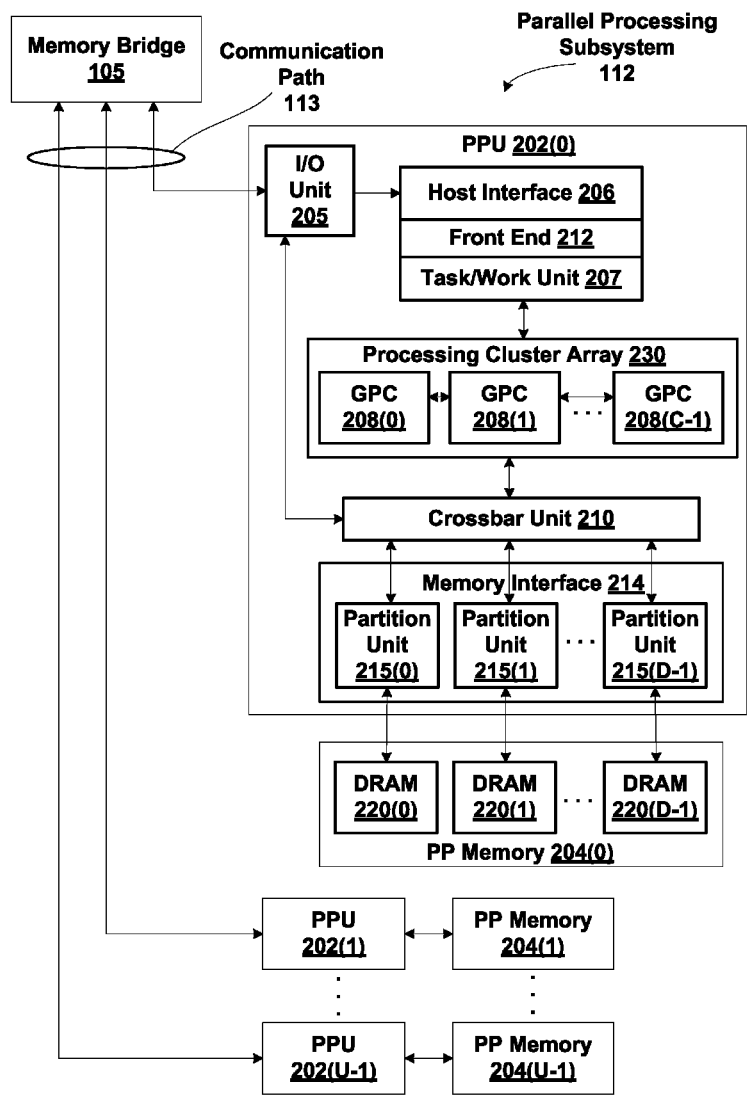
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202.

In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
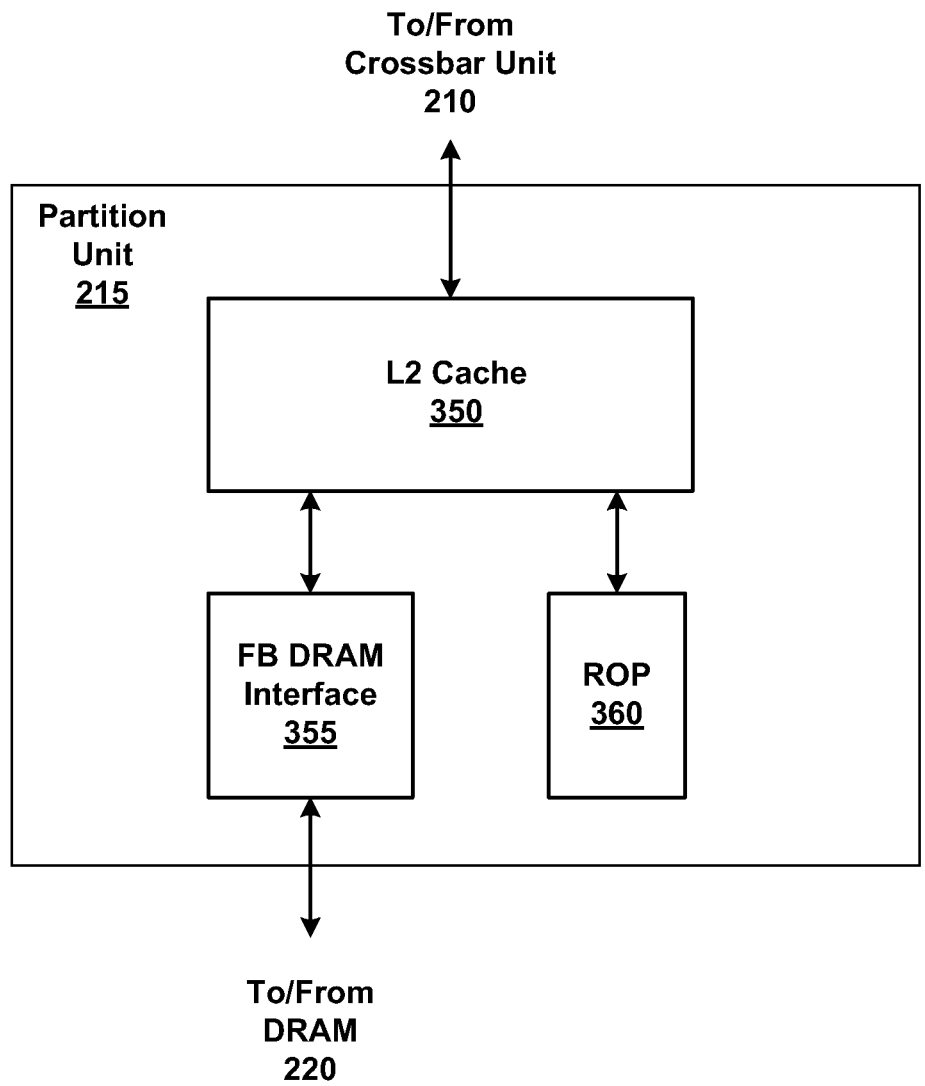
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
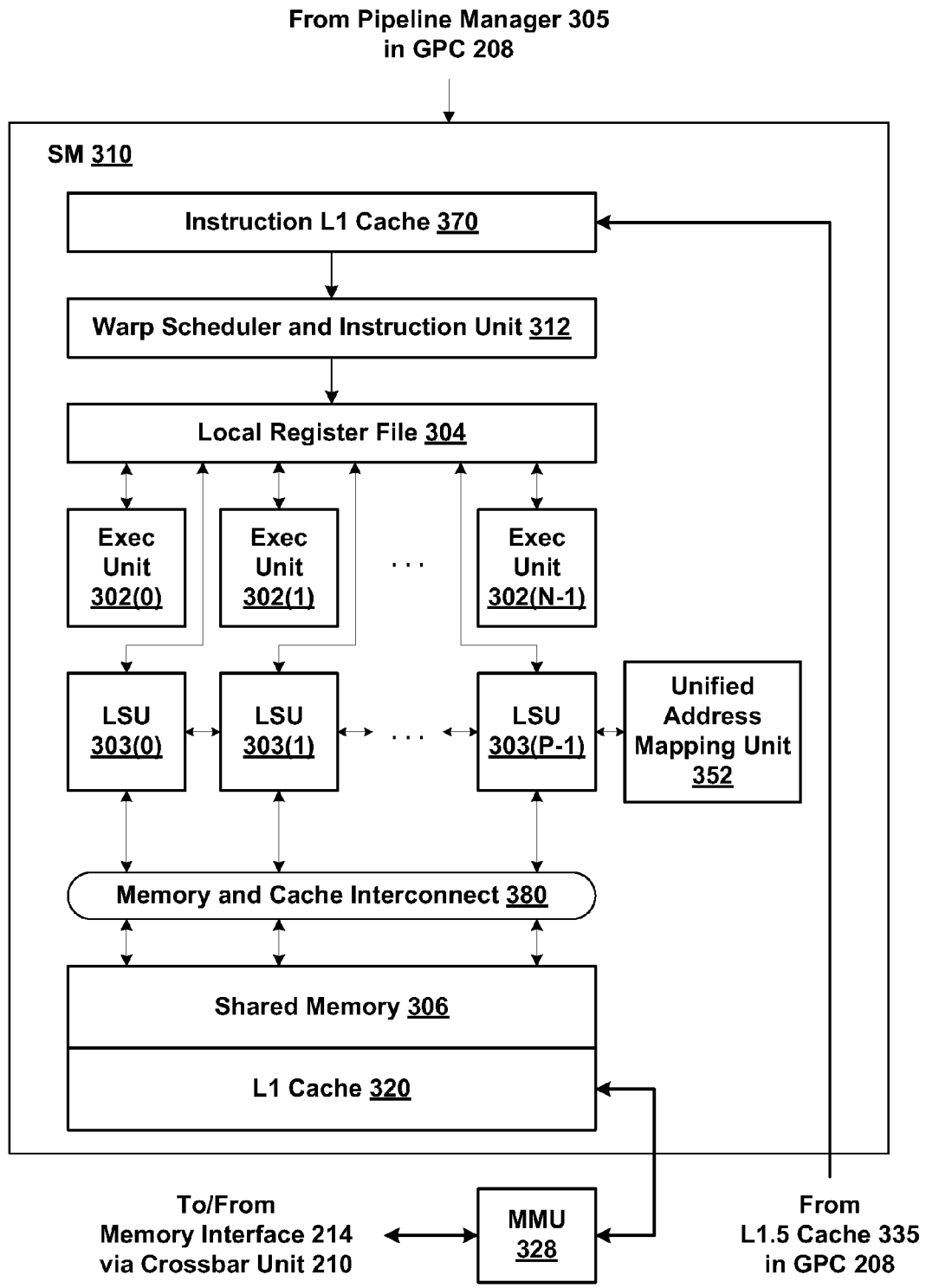
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes $\underline{M}$ streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320. As shown, GPC 208 includes a memory management unit (MMU) 328, which couples crossbar unit 210 to one or more other units within SM 310.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
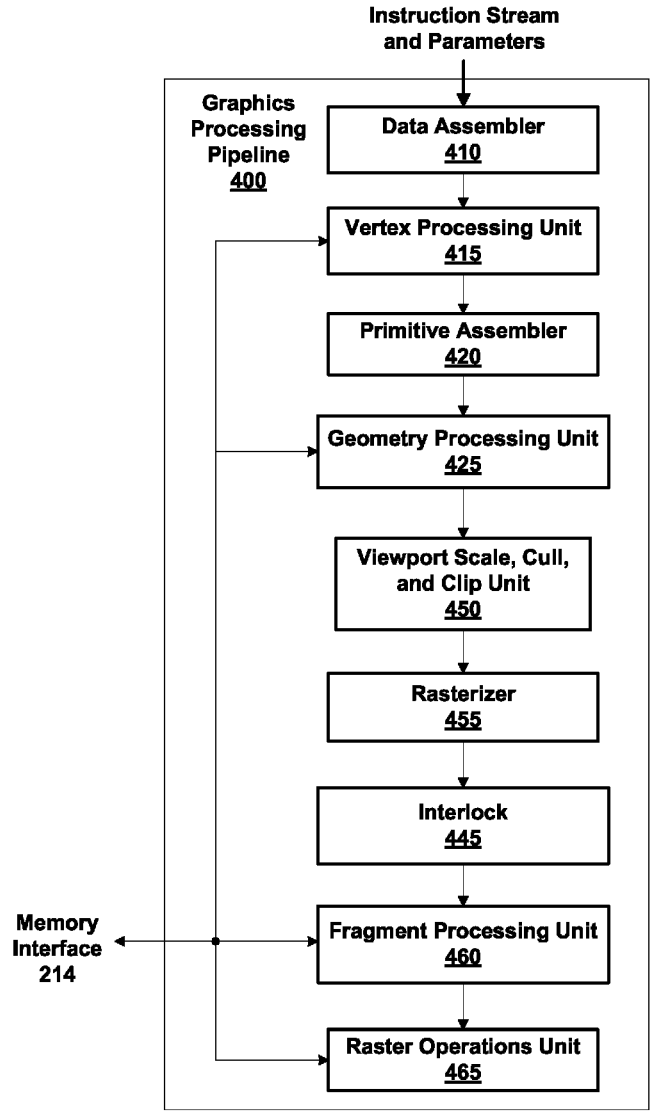
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

The interlock 445 detects when the fragment processing unit 460 is writing to the same location in the render target as a fragment processing unit 460 in another graphics processing pipeline 400. In some embodiments, two fragment processing units 460 may be configured to write to the same (x,y) location in the render target, where (x,y) represents the screen coordinates of a pixel. In such a case, a fragment shader program executing on a fragment processing unit 460 may not be launched at the same (x,y) location as a fragment shader program on a different fragment processing unit 460 that has not yet completed. The interlock 445 stalls the later fragment shader program and prevents the later shader program from launching until the first fragment shader program completes the read-modify-write operation to the given (x,y) location. This approach ensures that the later fragment shader program receives the final value from the prior fragment shader program directed to the same (x,y) location. Once the prior fragment shader program completes the write to the (x,y) location, the interlock 445 releases the later fragment shader program for execution.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Efficient Super-Sampling with Per-Pixel Shader Threads

As described above in conjunction with FIG. 4, the fragment processing unit 460 is configured to execute fragment shader programs, at pixel, sample, or other granularity, depending on the programmed sampling rate. For example, the fragment processing unit 460 could execute a pixel shader program to shade pixels or a sample shader program to separately shade each sample of a given pixel. The fragment processing unit 460 could achieve higher image quality by shading at sample granularity, at reduced performance as compared with pixel granularity. As further described below in conjunction with FIGS. 5-9, the fragment processing unit 460 could be configured to perform calculations once per pixel where possible. In such cases, the fragment processing unit 460 would detect when the pixel shader program is likely to produce the same result for multiple samples, and, in such a case, perform per-pixel calculations once for the multiple samples.

Figure 5:
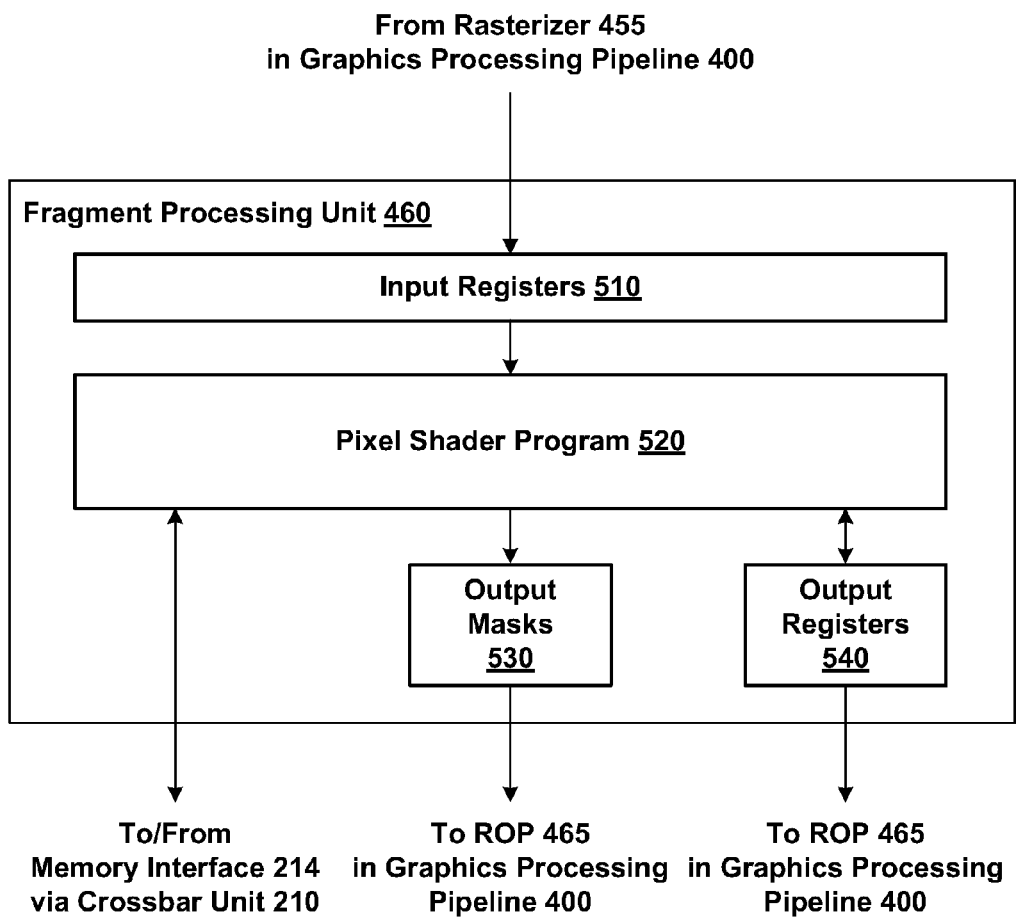
FIG. 5 illustrates the fragment processing unit of the graphics processing pipeline of FIG. 4, according to one embodiment of the invention.

FIG. 5 illustrates the fragment processing unit 460 of the graphics processing pipeline 400 of FIG. 4, according to one embodiment of the invention. As shown, the fragment processing unit 460 includes input registers 510, a pixel shader program 520, output masks 530, and output registers 540.

The input registers 510 compose a set of registers that are local to the fragment processing unit 460. The input registers 510 store fragments and coverage data received from the rasterizer 455. Fragments represent a portion of a graphics primitive that has been rasterized and is ready for fragment or pixel shading. A fragment is associated with various data parameters, which might be interpolated, including, but not limited to, the position of the fragment in screen space, the depth value of the fragment, values such as color or texture elements or surface normals, a stencil mask associated with the fragment, and a transparency value for the fragment. Coverage data includes the set of pixels or pixel samples in screen space that intersect with the fragment. The fragments and coverage data are then read by the pixel shader program 520 for further processing.

The pixel shader program 520 is a series of instructions, executed on a processor (not shown) in the fragment processing unit 460. The pixel shader program 520 is one form of a fragment shader program as described in conjunction with FIG. 4. As further described below, the pixel shader program 520 processes fragments and coverage data stored in the input registers, and transmits the processed data to the output registers 540 and output masks 530. Depending on the instructions in the pixel shader program 520, the transmitted data may be in the form of pixel information, or in the form of fragments and coverage data, as described above. Pixel information includes, without limitation, color information, typically expressed as red, green, and blue components, and depth information. The coverage data is transmitted via the output masks 530, which indicate the samples covered by the data in the output registers 540.

In one example, the pixel shader program 520 includes instructions to perform programmable blending. Blending operations include any pixel operations where pixel information is read from a render target, the pixel information is modified according to a given function, and the modified pixel information is written back to the render target. Typically, such blending operations are performed in an atomic manner, e.g. with a read operation and its paired write operation completed from/to the render target without any intervening read or write operations. With programmable blending, the pixel shader program 520 could perform the blending operation according to programmed instructions. As such, blending operations would not be limited to the fixed-function blending operations in the ROP 465. The pixel information calculated by the pixel shader program 520 could be different for each sample in a given pixel, because, even though the source value can be the same for all samples, the destination values can be different for each sample. Alternatively, the pixel information calculated by the pixel shader program 520 could be the same for two or more samples in a given pixel. The pixel shader program 520 could read data from the render target, and perform a blending operation according to the blending function defined within the pixel shader program 520. The pixel shader program 520 would then transmit the resulting pixel information to the render target via the output registers 540 and select the affected samples via the output masks 530. The pixel shader program 520 could transmit the pixel information via multiple dispatches where each dispatch would have a different output mask 530, thereby selecting different samples. Generally, there is a one-to-one correspondence between the total samples in a pixel and the bits in the output masks 530.

If the pixel information is different for each sample, then the pixel shader program 520 would transmit one dispatch for each sample. A corresponding output mask 530 would enable only the correct sample for writing. If the pixel information is the same for two or more samples, then the pixel shader program 520 would transmit one dispatch for the set of samples that have the same pixel information. A corresponding output mask 530 would enable only the correct multiple samples for writing. The pixel shader program 520 could detect a condition where all samples for a pixel are identical as stored in the render target, and the pixel information calculated by the pixel shader program 520 is the same for all samples. In such a case, the pixel shader program 520 performs the per-sample programmable blending operating only once, and transmits the resulting pixel information once through a single dispatch. A corresponding output mask 530 would enable all samples for the pixel for writing.

At the application programming interface (API) level, such a programmable blending function could be exposed as a pixel shader program 520 that includes a per-pixel pass and a program-selectable number of sample-based passes, where each sample-based pass could affect multiple samples. Each sample-based pass would perform, at most, one dispatch. The pixel shader program 520, could combine multiple sample-based passes into a single dispatch, where the pixel information is identical for the corresponding samples. As such, the pixel shader program 520 would efficiently execute in a single thread, first executing per-pixel calculations and then executing per-sample calculations. Exposing this feature at the API level as multiple dispatches advantageously provides flexibility to the pixel shader program 520, which could combine multiple dispatches into a single dispatch at render time.

In another example, the pixel shader program 520 includes instructions to perform forward rendering in a hybrid mode, where one portion of the pixel shader program 520 would execute once per pixel and a second portion of the pixel shader program 520 would execute once per sample. Typically, a graphics processing pipeline 400 operates in one of two modes, multi-sampled mode or super-sampled mode. In multi-sampled mode, the graphics processing pipeline 400 processes one set of pixel information for each pixel location, wherein the pixel information represents the color and depth values, typically at the center of each pixel. Multiple samples are generated at the final output of the graphics processing pipeline 400, for example, as a blending operation in the ROP 465. In super-sampled mode, the graphics processing pipeline 400 processes one set of pixel information for each sample location, wherein the pixel information represents the color and depth values for each sample within a pixel. Multiple samples per pixel are processed from the rasterizer 455 through the rest of the graphics processing pipeline 400. Super-sampled mode achieves higher image quality at the penalty of reduced performance. For example, where each pixel includes four samples, super-sampled mode would execute at approximately one-fourth the performance of multi-sampled mode. That is, super-sampled mode would execute at a speed four times slower than multi-sampled mode. Alternatively, super-sampled mode would consume four times the resources of the fragment processing unit 460 within the graphics processing pipeline 400 as multi-sampled mode.

With forward rendering in a hybrid mode, the image quality of super-sampled mode would be achieved with performance approaching that of multi-sampled mode. The stages in the graphics processing pipeline 400 that are upstream of the fragment processing unit 460 operate in multi-sampled mode. The stages in the graphics processing pipeline 400 that are downstream of the fragment processing unit 460 operate in super-sampled mode. The pixel shader program 520, executing in the fragment processing unit 460, operates in a hybrid mode, performing some operations once per pixel and other operations once per sample, as described below in conjunction with FIG. 6.

In yet another example, the pixel shader program 520 includes instructions to perform deferred rendering. With deferred rendering, the input registers 510 would be written with fragment data corresponding to high frequency attributes for each sample in a pixel, where the attributes are stored in a geometry buffer (G-buffer) (not shown). The pixel shader program 520 could pass fragment and coverage data from the input registers 510 directly to the output registers 540. The pixel shader program 520 could process the fragment or pass the fragment to the output registers 540 without processing. One fragment would be stored in one sample location in the render target. As such, when the pixel shader program 520 dispatches a fragment, a corresponding output mask 530 enables the dispatch to be written in a single sample location. At a later time, when multiple fragments have been stored in the render target, the pixel shader program 520 retrieves the fragments from the render targets. The pixel shader program 520 would process the fragments and calculate pixel information for one or more sample locations associated with a given pixel. The pixel shader program 520 could transmit the samples, via one or more dispatches, to the output registers 540. The output registers would then transfer the pixel information to the render targets via the memory interface 214, or would transmit the pixel information to the ROP 465 for ROP blending.

In some embodiments, an interlock mechanism may detect when multiple pixel shader programs 520 are performing operations for the same (x,y) location in the render target. The interlock mechanism may prevent a pixel shader program 520 from accessing a particular (x,y) location in the render target when another pixel shader program 520 is performing a blend operation (such as a read-modify-write) to the same (x,y) location. If the pixel shader programs 520 are performing ordered blending operations, then graphics objects are blended into the render target in a particular order. An interlock mechanism, such as the interlock 445 described in conjunction with FIG. 4, may stall a later pixel shader program 520 until a prior pixel shader program 520 completes a blending operation to the (x,y) location. This technique allows later pixel shader programs 520 to reliably use results from prior pixel shader programs 520 that run for the same (x,y) location.

Alternatively, the pixel shader programs 520 may be performing non-ordered blending operations. In such a case, the interlock mechanism does not need to ensure a particular blending order. Rather, the interlock mechanism may allow the pixel shader programs 520 to access locations in the render target in any order. In such a case, the interlock mechanism may employ a software lock to ensure that blending operations are performed atomically. The pixel shader program 520 may request a lock for a given (x,y) location before performing a blend operation to that (x,y) location. If the lock for the given (x,y) location is available, then the pixel shader program 520 may acquire the lock and may complete the read-modify-write to the (x,y) location. The pixel shader program 520 may then release the lock. If the lock for the given (x,y) location is not available, then another pixel shader program 520 may be performing a blend operation to the same (x,y) location. The pixel shader program may wait until the lock becomes available. When the lock becomes available, the pixel shader program 520 may acquire the lock and may complete the read-modify-write to the (x,y) location. The pixel shader program 520 may then release the lock.

The output masks 530 are a series of bits that enable or disable data received from the pixel shader program 520.

The output masks 530 determine which samples the are written with the data from the output registers 540. If the specific bit is set to one, then the corresponding sample storage location would be written with the data calculated by the pixel shader program 520 and written to the output registers 540. If the specific bit is set to zero, then the corresponding sample storage location would not be written with the data. In another example, a four-bit field in the output masks 530 could correspond to a specific set of four sample storage locations in the render targets, where the four samples compose a particular pixel. If the four-bit field is set to [1111], then all four corresponding sample storage locations would be written with the data calculated by the pixel shader program 520. If the four-bit field is set to [0000], then none of the four corresponding sample storage location would be written with the data. If the four-bit field is set to [0100], then only the second corresponding sample storage location would be written with the data. As a further example with multiple dispatches, a first dispatch with [1000] would write the first sample with a first set of output register values, a second dispatch with [0100] would write the second sample with a second set of output register values, etc. Each dispatch can write to multiple render targets by having multiple subsets of the output register values each written to a corresponding render target.

The output registers 540 include a set of registers that are local to the fragment processing unit 460. The output registers 510 store data from the pixel shader program 520. As described above, such data may be in the form of pixel information, including color information, depth information, and other attributes of the pixels. Alternatively, the data may be in the form of fragments and coverage data, such as in the case of deferred rendering. Depending on the specific instructions in the pixel shader program 520 and the state of the graphics processing pipeline 400, the data in the output registers 540 may be transmitted to the ROP 465, or written directly to the render target by transmitting the data to the memory interface 214 via the crossbar unit 210.

In some embodiments, the output registers 540 may not directly support multiple dispatches from the pixel shader program 520. In such a case, the pixel shader output registers 540 may be standard single-dispatch shader registers. In such architectures, when the pixel shader program 520 terminates, a separate process (not shown) reads the output registers 540 and send the corresponding values downstream to the render targets or to the ROP 465. For output registers 540 that do support multiple-dispatch pixel shaders, transfers to the render targets may be accomplished via any technically feasible approach, including, without limitation: (i) stalling the pixel shader program 520 after each dispatch until the output registers 540 have been read, and then issuing the next dispatch; (ii) storing data in output registers 540 that are dedicated to a particular dispatch; (iii) storing data in a double-buffered set of registers where the two buffers are swapped between dispatches; and (iv) storing dedicated data in a single-buffered register set and per-sample output data in a double-buffered register set.

Figure 6:
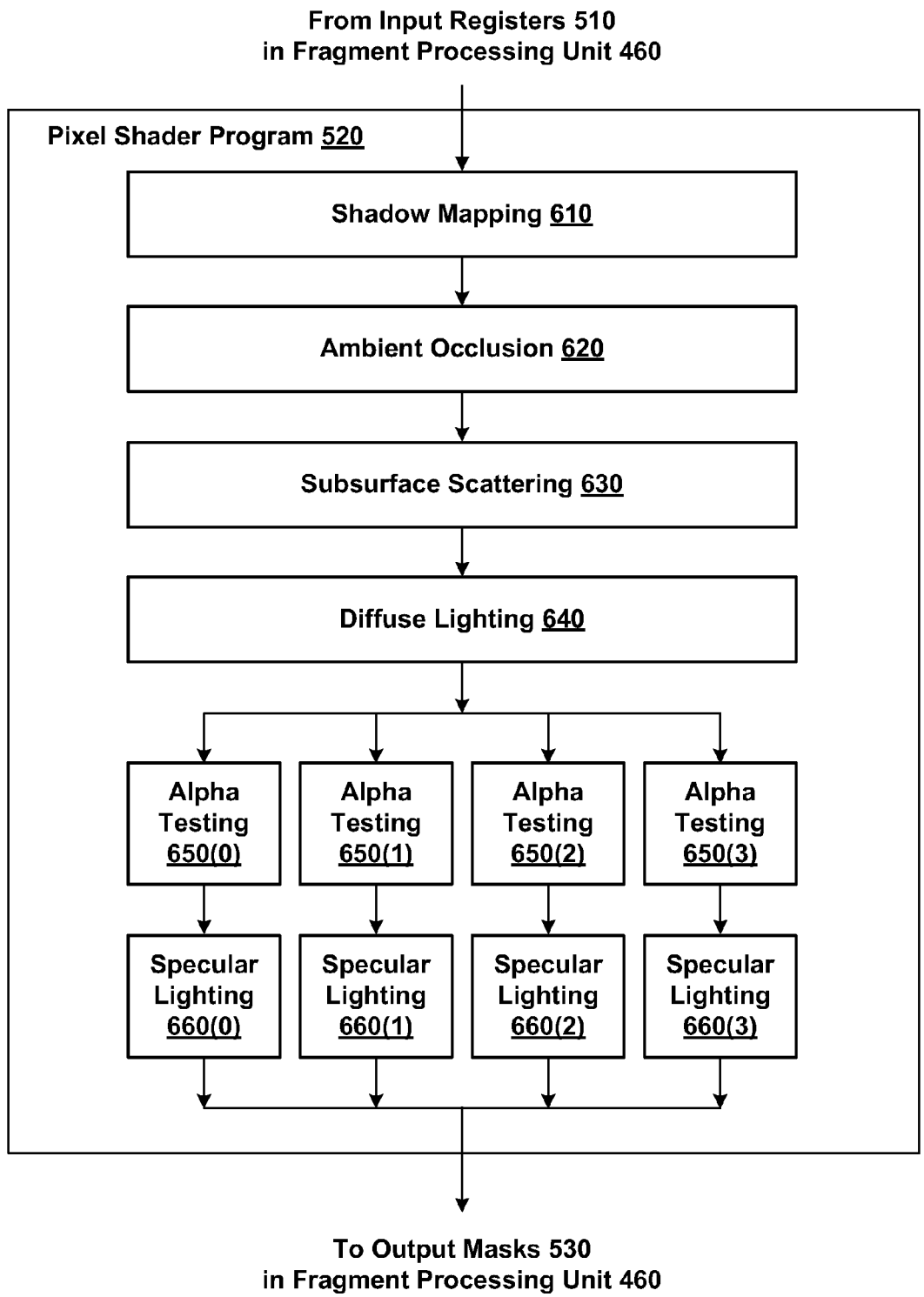
FIG. 6 illustrates the pixel shader program within the fragment processing unit of FIG. 5, according to one embodiment of the invention.

FIG. 6 illustrates the pixel shader program 520 within the fragment processing unit 460 of FIG. 5, according to one embodiment of the invention. As shown, the pixel shader program 520 includes multiple stages including a shadow mapping stage 610, an ambient occlusion stage 620, a subsurface scattering stage 630, a diffuse lighting stage 640, alpha testing stages 650, and specular lighting stages 660.

The shadow mapping stage 610 creates shadows that result when a graphics object blocks the path of a light source. The shadow mapping stage 610 creates a shadow when a visible pixel is determined to be closer to a light source than another pixel in the same path of light. The shadow mapping stage 610 transmits results of the shadow mapping operation to the ambient occlusion stage 620.

The ambient occlusion stage 620 approximates the radiance of a light source, where the illumination at each pixel in the image is based on other graphics object in the scene. The ambient occlusion stage 620 transmits results of the ambient occlusion operation to the subsurface scattering stage 630.

The subsurface scattering stage 630 approximates the effect where light partially penetrates the surface of a translucent graphics object at a specific point, is scattered internally by the translucent object, and then exits the translucent object at a different point. The subsurface scattering stage 630 transmits results of the subsurface scattering operation to the diffuse lighting stage 640.

The diffuse lighting stage 640 approximates the effect where light strikes a graphics object and is reflected in many directions by the surface. Diffuse lighting is characterized by objects that have an irregular or matted surface and is contrasted with specular lighting, described below. The diffuse lighting stage 640 transmits results of the diffuse lighting operation to the alpha testing stages 650.

Typically, the calculations performed by the shadow mapping stage 610, ambient occlusion stage 620, subsurface scattering stage 630, and diffuse lighting stage 640 exhibit low spatial frequency. That is, the resulting pixel information from these stages may not appreciably change between adjacent pixels. As such, these stages may execute once per pixel without noticeable loss in image quality. After completion of these stages, a single set of pixel information is transmitted to the alpha testing stages 650(0)-650(3), where each alpha testing stage 650 executes once per sample.

The alpha testing stages 650 test pixels calculated by the pixel shader program against pixels previously stored in the render target. If the calculated pixels have a depth value that is less than the depth value in the render target, then the calculated pixel is stored in the render target, otherwise the calculated pixel is discarded. In some embodiments, the calculated pixel is blended with the stored pixel based on the respective depth values and other parameters. Typically, the calculations performed by the alpha testing stages 650 exhibit high spatial frequency. That is, the resulting pixel information from the alpha testing stages 650 may appreciably change between adjacent pixels. As such, performing alpha testing once per pixel may result in noticeable loss in image quality. Accordingly, alpha testing is performed once per sample. Alpha testing stages 650(0) performs alpha testing for a first sample, alpha testing stages 650(1) performs alpha testing for a second sample, and so on. Each alpha testing stage 650(0)-650(3) transmits results of the alpha testing operation to a corresponding specular lighting stage 660(0)-660(3).

The specular lighting stages 660 approximate the effect of light striking the surface of a graphics object and being reflected in a single direction by the surface. Specular lighting is characterized by objects that have a smooth, highly reflective surface and is contrasted with diffuse lighting, described above. Typically, the calculations performed by the specular lighting stages 660 exhibit high spatial frequency. That is, the resulting pixel information from the specular lighting stages 660 may change appreciably between adjacent samples. As such, performing specular lighting once per pixel may result in noticeable loss in image quality. Accordingly, specular lighting is performed once per sample, as described above. The specular lighting stages 660 transmit results of the specular lighting operation to the output registers 540 as the per-sample outputs of the pixel shader program 520, by using different values of sample masks 530.

Figure 7A:
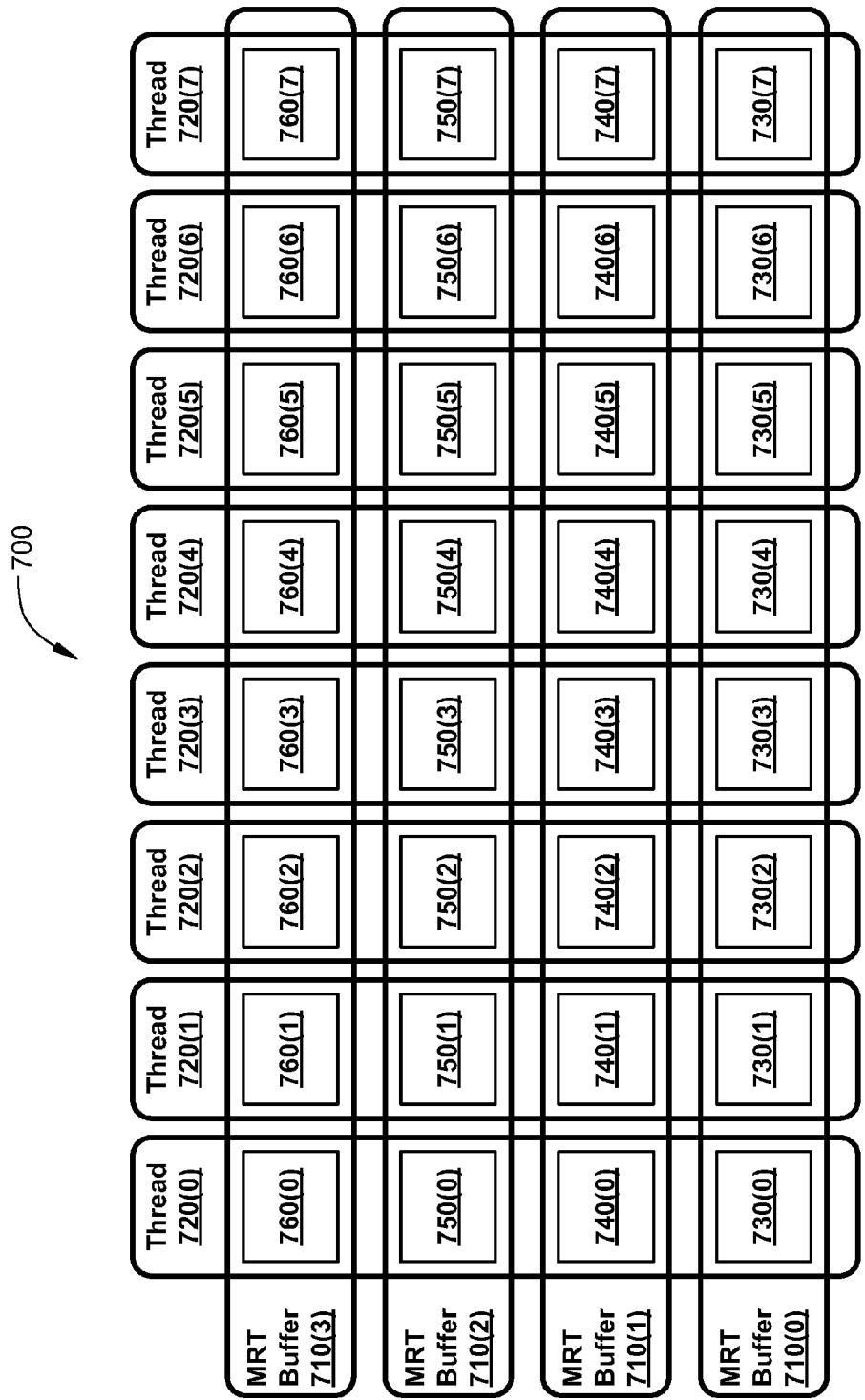
FIG. 7A illustrates a portion of the output registers within the fragment processing unit of FIG. 5, according to one embodiment of the invention.

FIG. 7A illustrates a portion of the output registers 700 within the fragment processing unit 460 of FIG. 5, according to one embodiment of the invention. As shown, the portion of the output registers 700 includes multiple render target (MRT) buffers 710 that are written by multiple threads 720 simultaneously executing in the fragment processing unit 460.

The MRT buffers 710 are register banks within the portion of the output registers 700. Each MRT buffer 710 includes a set of locations that corresponds to a different render target. MRT buffer 710(0) corresponds to render target 0, MRT buffer 710(1) corresponds to render target 1, and so on. Each MRT buffer 710 includes a number of sample locations 730, 740, 750, 760 that store pixel information corresponding to a particular sample. Threads 720 are instances of the pixel shader program 520, and the eight threads 720 store sample information for the first sample of eight corresponding pixels in the MRT buffer 710(0) at sample locations 730(0)-730(7). Likewise, threads 720 store sample information for the second sample in the MRT buffer 710(1) at sample locations 740(0)-740(7), for the third sample in the MRT buffer 710(2) at sample locations 750(0)-750(7), and for the fourth sample in the MRT buffer 710(3) at sample locations 760(0)-760(7). In this arrangement, the MRT buffers 710 for a particular thread store data for multiple samples within a pixel for a particular render target, rather than for single pixels across multiple render targets as in the prior art.

The threads 720 represent separate instances of the pixel shader program 520, where each instance calculates pixel information for a quantity of samples in a given pixel. Typically, the pixel shader program 520 writes only one sample location in a given MRT buffer 710, but for a given thread 720, all the samples within a particular pixel in a render target are covered by the part of the MRT buffer 710 corresponding to that thread. As such, the instance of pixel shader program 520 at thread 720(0) writes sample 730(0) to MRT buffer 710(0) directed to the first render target, the instance of pixel shader program 520 at thread 720(0) writes sample 740(0) to MRT buffer 710(1) directed to the second render target, and so on. As a result, thread 720(0) calculates pixel information for a first group of four samples and stores the pixel information in samples 730(0), 740(0), 750(0), and 760(0). These four samples correspond to MRT buffers 710(0)-710(3), respectively. Likewise, thread 720(1) calculates pixel information for a second group of four samples, and stores the pixel information at sample locations 730(1), 740(1), 750(1), and 760(1), and so on. Once all threads 720(0)-720(7) populate the sample locations 730, 740, 750, 760, the MRT buffers 710(0)-710(3) may be transferred to the corresponding pixels in the multiple render tickets. In some embodiments, the output masks 530 may be different for each thread 720. For example, the output mask for thread 720(0) could enable only samples 730(0) and 740(0) for writing in a given dispatch, thread 720(1) could enable only samples 760(1) for writing, and thread 720(2) could enable four samples for writing 730(2), 740(2), 750(2) and 760(2), all in the same dispatch.

Figure 7B:
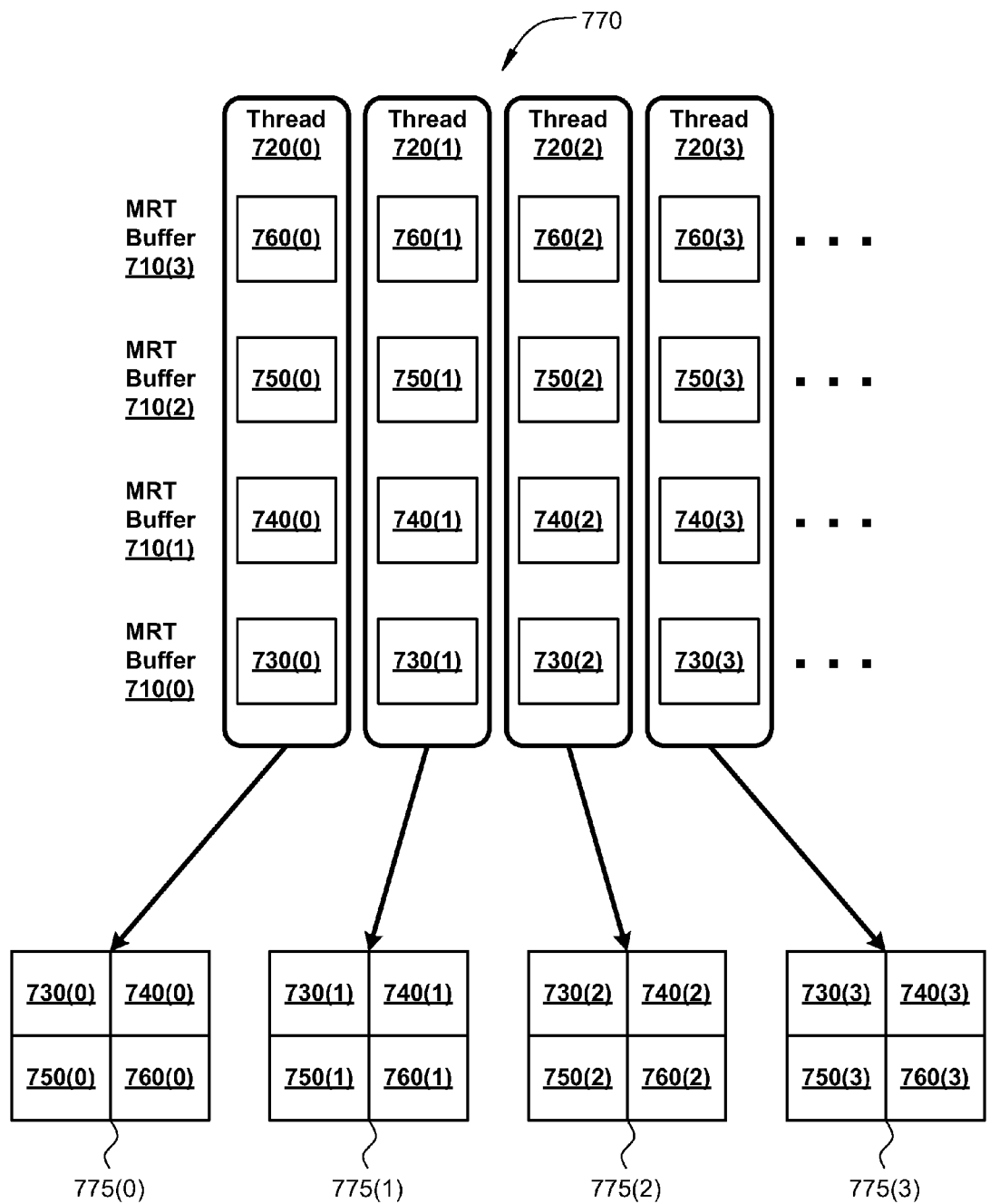
FIG. 7B illustrates a portion of the output registers within the fragment processing unit of FIG. 5, according to another embodiment of the invention.

FIG. 7B illustrates a portion of the output registers 770 within the fragment processing unit 460 of FIG. 5, according to another embodiment of the invention. As shown, the portion of the output registers 770 includes MRT buffers 710 that are populated by threads 720. The MRT buffers 710 and the threads 720 function substantially the same as described in conjunction with FIG. 7A, except as further described below.

As shown, each of the threads 720 calculates pixel information for a corresponding pixel 775 in the render targets. Thread 720(0) calculates pixel information for the four samples of pixel 775(0), and stores the pixel information at sample locations 730(0), 740(0), 750(0), and 760(0). Likewise, thread 720(1) calculates pixel information for the four samples of pixel 775(1), and stores the pixel information at sample locations 730(1), 740(1), 750(1), and 760(1), and so on. Although threads populate a vertical strip of sample locations 730, 740, 750, 760 spanning the MRT buffers 710, the sample locations 730, 740, 750, 760 may be efficiently transferred to the multiple render targets one MRT buffer 710 at a time, as further described below.

Figure 7C:
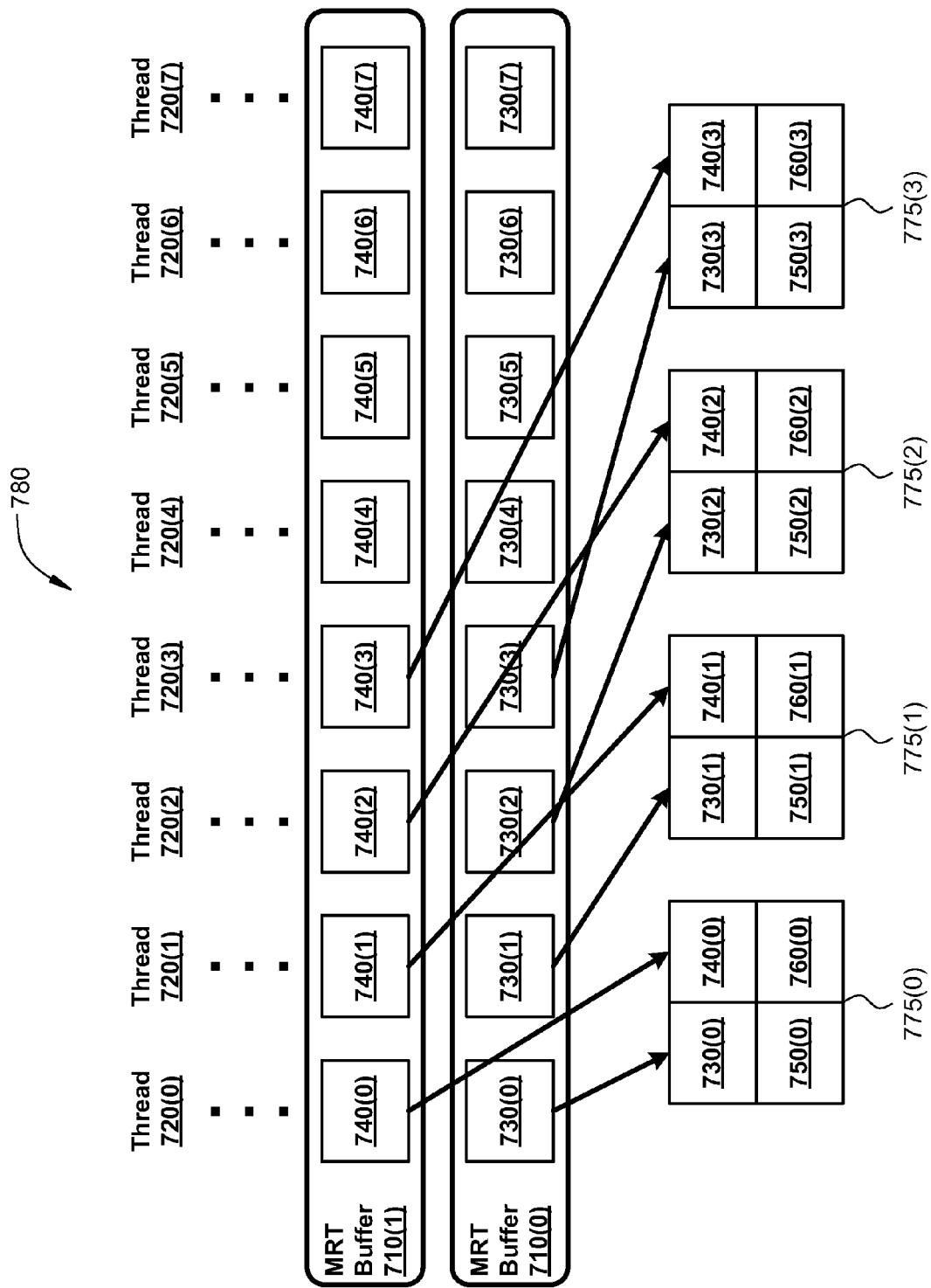
FIG. 7C illustrates a portion of the output registers within the fragment processing unit of FIG. 5, according to yet another embodiment of the invention.

FIG. 7C illustrates a portion of the output registers 780 within the fragment processing unit 460 of FIG. 5, according to yet another embodiment of the invention. As shown, the portion of the output registers 780 includes MRT buffers 710 that are populated by threads 720. The MRT buffers 710 and the threads 720 function substantially the same as described in conjunction with FIGS. 7A-7B, except as further described below.

As shown, MRT buffer 710(0) includes sample locations 730(0)-730(3) corresponding to first samples for a group of four pixels 775(0)-775(3), as calculated by threads 720(0)-720(3). A single transfer from the portion of output registers 780 may transfer values in the sample locations 730(0)-730(3) to a data collector (not shown) associated with the multiple render targets. MRT buffer 710(1) includes sample locations 740(0)-740(3) corresponding to second samples for the group of four pixels 775(0)-775(3). A single transfer from the portion of output registers 780 may transfer values in the sample locations 740(0)-740(3) to the data collector associated with the multiple render targets. Similar transfers may transfer values for the third and fourth samples from the portion of output registers 780 to the data collector. Once the data collector includes all sample values for the four pixels 775(0)-775(3), the data collector rearranges the data for storage in the proper render target memory locations for the four pixels 775(0)-775(3). Additional transfers may then transfer sample information calculated by threads 720(4)-720(7) for a second group of four pixels (not shown). In some embodiments, the MRT buffers 710 are transferred from the output registers 540 to the ROP 465, along with corresponding output masks 530, in one or more dispatches. In other embodiments, the pixel shader program 520 reads the MRT buffers 710 in the output registers 540, along with corresponding output masks 530, and transfers the MRT buffers 710 and output masks 530 to the render targets in one or more dispatches.

Figure 8:
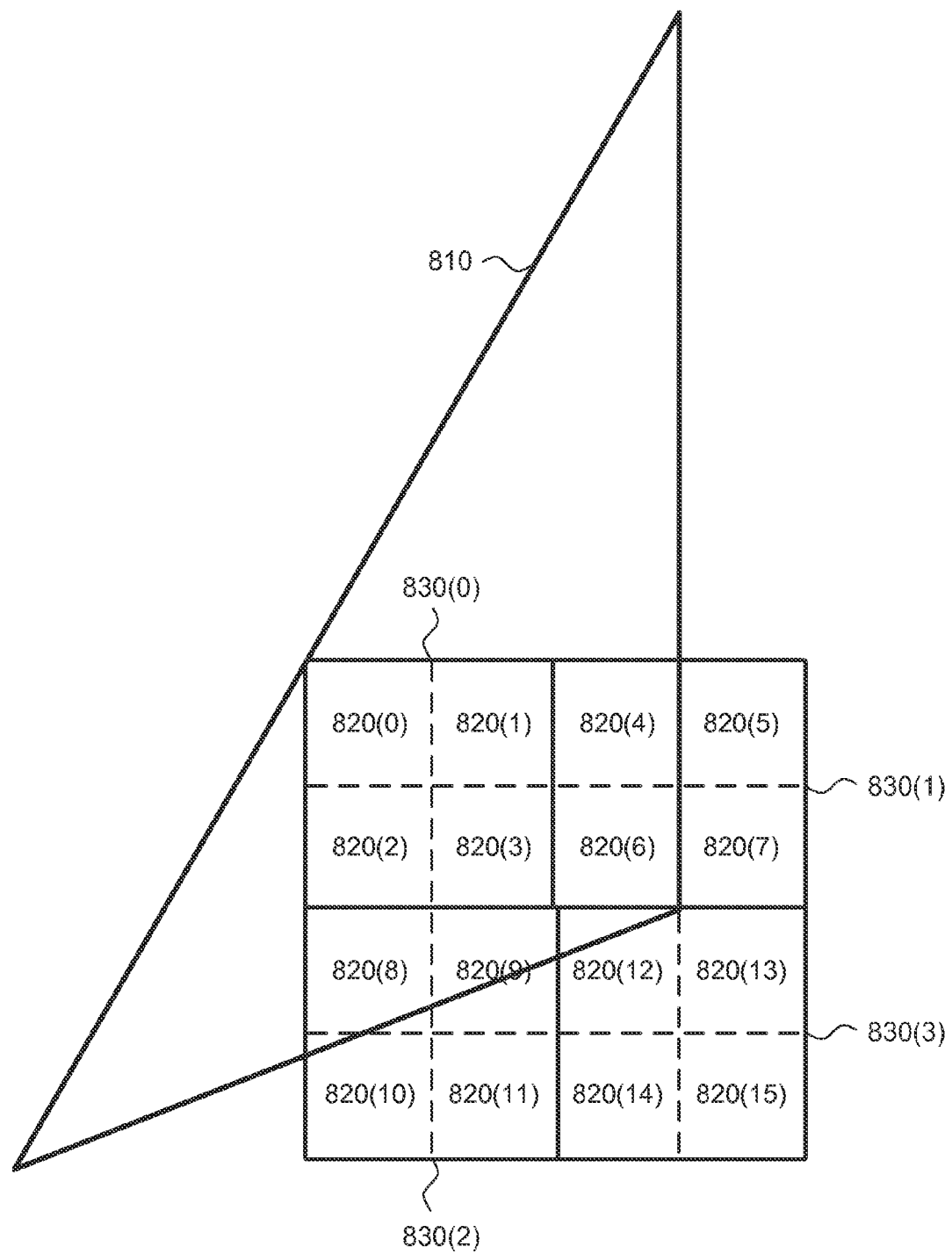
FIG. 8 illustrates a geometry primitive that intersects multiple pixels in a render target, according to one embodiment of the invention.

FIG. 8 illustrates a geometry primitive 810 that intersects multiple pixels 830 in a render target, according to one embodiment of the invention. As shown, each of the pixels 830 includes four samples 820. The geometry primitive 810 completely covers all four samples 820(0)-820(3) of pixel 830(0). Accordingly, the pixel shader program 520 may transfer sample information for all four samples 820(0)-820(3) with a single dispatch. The geometry primitive 810 completely covers two of the samples 820(4) 820(6) of pixel 830(1). Accordingly, the pixel shader program 520 may transfer sample information for samples 820(4) 820(6) with a single dispatch. The geometry primitive 810 partially covers three of the samples 820(8)-820(10) of pixel 830(2). Accordingly, the pixel shader program 520 may transfer sample information for samples 820(8)-820(10) with a single dispatch. Alternatively, sample information may be different for each of the samples 820(8)-820(10) because the geometry primitive 810 covers a different amount of each sample 820(8)-820(10), or because specular highlights (or some other shading effect) create different color values. As such, the pixel shader program 520 may transfer sample information for samples 820(8)-820(10) with three separate dispatches. Finally, the geometry primitive 810 partially covers one of the samples 820(12) of pixel 830(3). Accordingly, the pixel shader program 520 may transfer sample information for sample 820(12) with a single dispatch.

It will be appreciated that the architecture described herein is illustrative only and that variations and modifications are possible. In one example, the techniques are described herein in the context of eight threads, each computing pixel information for pixels that include four samples each. However, the described techniques could be employed to shade pixels that include any number of samples per pixel. In addition, the described techniques could be employed across any number of threads, where the direct pixel information to any number of render targets.

Figure 9:
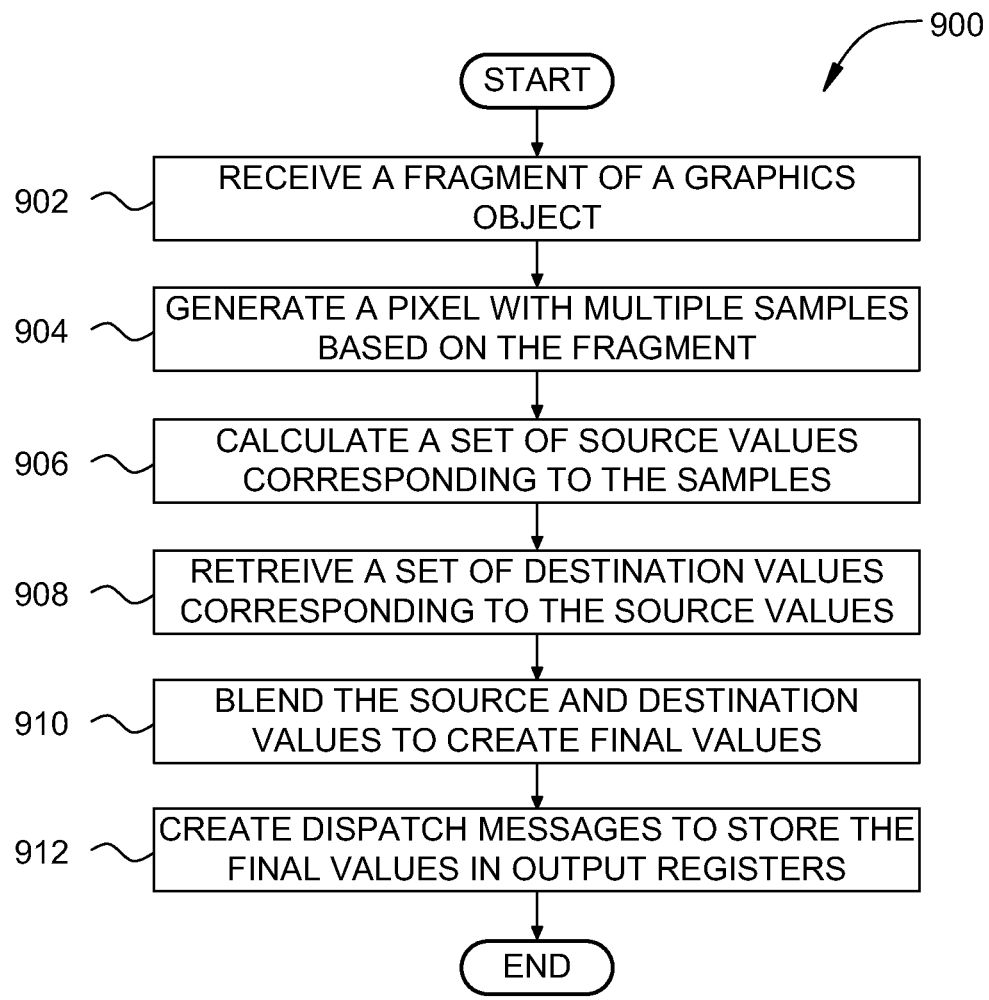
FIG. 9 sets forth a flow diagram of method steps for dispatching pixel values from a pixel shader program in a graphics processing pipeline, according to one embodiment of the present invention.

FIG. 9 sets forth a flow diagram of method steps for dispatching pixel values from a pixel shader program 520 in a graphics processing pipeline 400, according to one embodiment of the present invention. Although the method steps are described in conjunction with the systems of FIGS. 1-70, persons of ordinary skill in the art will understand that any system configured to perform the method steps, in any order, is within the scope of the inventions.

As shown, a method 900 begins at step 902, where the fragment processing unit 460 receives a fragment that includes at least one pixel, where a fragment is a portion of a graphics primitive. At step 904, the fragment processing unit 460 generates a pixel that includes multiple samples based on the received fragment. At step 906, the fragment processing unit 460 calculates a set of source values where each source value corresponds to a different sample of the pixel. At step 908, the fragment processing unit 460 retrieves destination values from a render target, where each destination value corresponds to a different source value. At step 910, the fragment processing unit 460 blends each source value with the corresponding destination value to create final values. At step 912, creates one or more dispatch messages to store the final values in a set of output registers. The method 900 then terminates.

Figure 10:
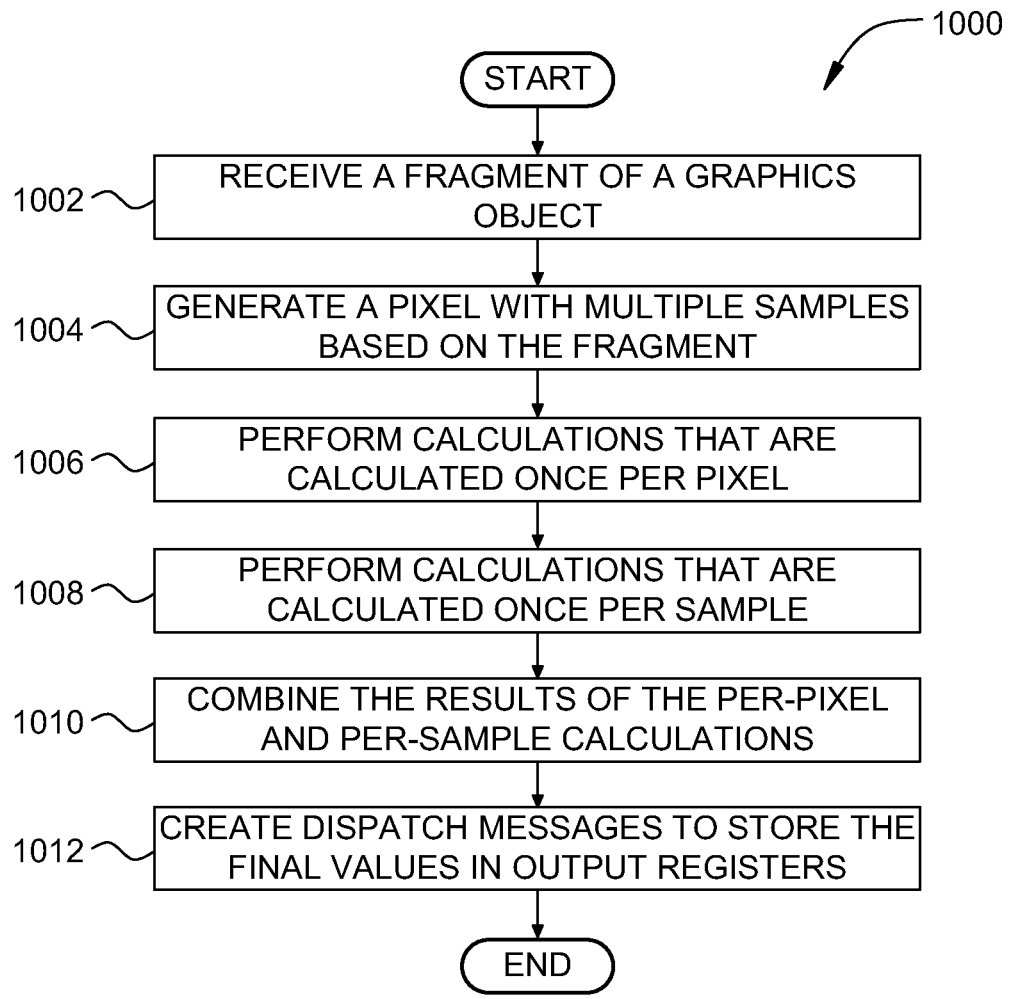
FIG. 10 sets forth a flow diagram of method steps for dispatching pixel values from a pixel shader program 520 in a graphics processing pipeline 400, according to another embodiment of the present invention.

FIG. 10 sets forth a flow diagram of method steps for dispatching pixel values from a pixel shader program 520 in a graphics processing pipeline 400, according to another embodiment of the present invention. Although the method steps are described in conjunction with the systems of FIGS. 1-7C, persons of ordinary skill in the art will understand that any system configured to perform the method steps, in any order, is within the scope of the inventions.

As shown, a method 1000 begins at step 1002, where the fragment processing unit 460 receives a fragment that includes at least one pixel, where a fragment is a portion of a graphics primitive. At step 1004, the fragment processing unit 460 generates a pixel that includes multiple samples based on the received fragment. At step 1006, the fragment processing unit 460 performs one or more calculations that are calculated once per pixel. At step 1008, the fragment processing unit 460 performs one or more calculations that are calculated once for each sample of the pixel. At step 1010, the fragment processing unit 460 combines the results of the per-pixel calculations with the results of the per-sample calculations, to create final values for each sample of the pixel. At step 1012, the fragment processing unit creates one or more dispatch messages to store the final values in a set of output registers. The method 1000 then terminates.

In sum, a fragment processing unit includes a pixel shader program configured to transmit multiple dispatches for each pixel to one or more render targets. The pixel shader program executes in a single thread, by first performing per-pixel calculations and then performing per-sample calculations. Per-pixel calculations are performed once for all samples in the pixel. If multiple samples for a given pixel have identical source and destination pixel information, then the multiple samples are included in a sample set. The per-sample calculations may be performed once for each sample set, rather than once for each sample. The pixel shader program then dispatches resulting pixel information once for each sample set, along with a corresponding output mask, to store the blended samples back into the render targets. An interlock mechanism detects a condition where a new pixel shader program is launched for the same pixel location as a currently executing pixel shader program. In such a case, the newly launched pixel shader program stalls until the currently executing pixel shader program completes.

One advantage of the disclosed techniques is that pixel shader programs perform per-sample operations with increased efficiency. In typical scenarios, the pixel shader program achieves the higher image quality of per-sample pixel shading, with performance approaching that of per-pixel shading.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for dispatching pixel information in a graphics processing pipeline, the method comprising:
   generating a first pixel comprising a plurality of samples based on a first portion of a graphics primitive received by a first thread executing on a multiprocessor;
   calculating a first value for the first pixel, wherein the first value is calculated only once for the first pixel;
   calculating, via the multiprocessor, a first set of values for the samples in the plurality of samples;
   combining the first value for the first pixel with each value in the first set of values for the samples to create a second set of values; and creating at least one dispatch message to store the second set of values in a set of output registers.

2. The method of claim 1, further comprising:
determining that a second thread is performing an operation on the first pixel;
stalling the second thread until the first thread completes executing operations related to the first pixel; and
releasing the second thread.

3. The method of claim 1, wherein the at least one dispatch message comprises two or more dispatch messages, and creating the two or more dispatch messages comprises:
determining that two or more values in the second set of values are equal;
generating an output mask to enable write operations related to sample locations corresponding to the two or more values and to disable write operations related to other sample locations associated with the first pixel; and
creating a dispatch message that includes a copy of the two or more values.

4. The method of claim 1, further comprising transferring contents of the set of output registers to a raster operations unit.

5. The method of claim 1, further comprising transferring contents of the set of output registers to a render target.

6. The method of claim 5, wherein transferring the contents of the set of output registers comprises:
reading an output register that includes values for a plurality of sample locations, wherein each sample location corresponds to a first sample of a different pixel in a plurality of pixels; and
writing the value for each sample location in the plurality of sample locations into a corresponding sample location in the render target.

7. The method of claim 6, wherein the value for each sample location in the plurality of sample locations is written by a same thread.

8. The method of claim 1, wherein the second set of values comprises pixel information related to one or more samples in the plurality of samples, wherein the pixel information includes at least one of color information and depth information.

9. The method of claim 1, wherein the second set of values comprises fragment information associated with the first portion of the graphics primitive, wherein the fragment information includes at least one of a fragment position, a color element, a texture element, a stencil mask, a transparency value, and coverage data.

10. A subsystem comprising:
a memory that includes a fragment shading program; and
a multiprocessor that, when executing the fragment shading program, is configured to dispatch pixel information in a graphics processing pipeline by performing the steps of:
generating a first pixel comprising a plurality of samples based on a first portion of a graphics primitive received by a first thread executing on the multiprocessor;
calculating a first value for the first pixel;
calculating a first set of values for the samples in the plurality of samples;
combining the first value for the first pixel with the first set of values for the samples to create a second set of values; and
creating at least one dispatch message to store the second set of values in a set of output registers.

11. The subsystem of claim 10, wherein the multiprocessor is further configured to perform the steps of:
determining that a second thread is performing an operation on the first pixel;
stalling the second thread until the first thread completes executing operations related to the first pixel; and
releasing the second thread.

12. The subsystem of claim 10, wherein the at least one dispatch message comprises two or more dispatch messages, and creating the two or more dispatch messages comprises:
determining that two or more values in the second set of values are equal;
generating an output mask to enable write operations related to sample locations corresponding to the two or more values and to disable write operations related to other sample locations associated with the first pixel; and
creating a dispatch message that includes a copy of the two or more values.

13. The subsystem of claim 10, wherein the multiprocessor is further configured to perform the step of transferring contents of the set of output registers to a raster operations unit.

14. The subsystem of claim 10, wherein the multiprocessor is further configured to perform the step of transferring contents of the set of output registers to a render target.

15. The subsystem of claim 14, wherein transferring the contents of the set of output registers comprises:
reading an output register that includes values for a plurality of sample locations, wherein each sample location corresponds to a first sample of a different pixel in a plurality of pixels; and
writing the value for each sample location in the plurality of sample locations into a corresponding sample location in the render target.

16. The subsystem of claim 15, wherein the value for each sample location in the plurality of sample locations is written by a same thread.

17. The subsystem of claim 10, wherein the second set of values comprises pixel information related to one or more samples in the plurality of samples, wherein the pixel information includes at least one of color information and depth information.

18. The subsystem of claim 10, wherein the second set of values comprises fragment information associated with the first portion of the graphics primitive, wherein the fragment information includes at least one of a fragment position, a color element, a texture element, a stencil mask, a transparency value, and coverage data.

19. A non-transitory computer-readable storage medium including instructions that, when executed by a processor, cause the processor to dispatch pixel information in a graphics processing pipeline, by performing the steps of:
generating a first pixel comprising a plurality of samples based on a first portion of a graphics primitive received by a first thread;
calculating a first value for the first pixel, wherein the first value is calculated only once for the first pixel;
calculating a first set of values for the samples in the plurality of samples, wherein each value in the first set of values corresponds to a different sample in the plurality of samples and is calculated only once for the corresponding sample;
combining the first value with each value in the first set of values to create a second set of values; and
creating two or more dispatch messages to store the second set of values in a set of output registers.

20. The non-transitory computer-readable storage medium of claim 19, further comprising:
   determining that a second thread is performing an operation on the first pixel;
   stalling the second thread until the first thread completes executing operations related to the first pixel; and
   releasing the second thread.

* * * * *